(12) United States Patent
Willenbücher et al.

(10) Patent No.: US 11,905,147 B2
(45) Date of Patent: Feb. 20, 2024

(54) METHOD FOR THE OPERATION OF A FORESTRY WINCH AND FORESTRY WINCH

(71) Applicant: Bernward Welschof, Grossostheim (DE)

(72) Inventors: Michael Willenbücher, Oberzent (DE); Claus Hofmann, Haibach (DE); Bernward Welschof, Grossostheim (DE)

(73) Assignee: Bernward Welschof, Grossostheim (DE)

( * ) Notice: Subject to any disclaimer, the term of this patent is extended or adjusted under 35 U.S.C. 154(b) by 0 days.

(21) Appl. No.: 17/741,588

(22) Filed: May 11, 2022

(65) Prior Publication Data

US 2022/0363522 A1 Nov. 17, 2022

(30) Foreign Application Priority Data

May 12, 2021 (DE) ..................... 10 2021 112 421.2
May 25, 2021 (DE) ..................... 10 2021 113 379.3

(51) Int. Cl.
*B66D 1/50* (2006.01)
*A01G 23/00* (2006.01)
*B66D 1/08* (2006.01)

(52) U.S. Cl.
CPC ............. *B66D 1/50* (2013.01); *A01G 23/003* (2013.01); *B66D 1/08* (2013.01); *B66D 2700/0108* (2013.01); *B66D 2700/0133* (2013.01)

(58) Field of Classification Search
CPC ... B66D 1/50; B66D 1/08; B66D 1/60; B66D 1/7415; B66D 2700/0133; B66D 1/36; A01G 23/003
See application file for complete search history.

(56) References Cited

U.S. PATENT DOCUMENTS

2022/0306432 A1* 9/2022 Willenbücher ...... B66D 1/7415
2022/0306433 A1* 9/2022 Willenbücher .......... B66D 1/60

FOREIGN PATENT DOCUMENTS

| DE | 2020050200694 U1 | 7/2006 | |
|---|---|---|---|
| DE | 102011122121 B3 | 6/2013 | |
| EP | 3042875 A1 * | 7/2016 | ............... B66D 1/08 |
| EP | 3067308 A1 * | 9/2016 | ............... B66D 1/08 |
| FR | 2487802 A1 | 2/1982 | |
| WO | 2013092332 A1 | 6/2013 | |
| WO | WO-2013180665 A1 * | 12/2013 | ............... B66D 1/36 |
| WO | WO-2015069194 A1 * | 5/2015 | ............... B66D 1/38 |

* cited by examiner

*Primary Examiner* — Emmanuel M Marcelo
(74) *Attorney, Agent, or Firm* — The Webb Law Firm

(57) ABSTRACT

A method for an operation of a forestry winch, which has a rope drum driven by a drive motor and on which a rope is wound up, and has a rope ejector roller for the rope driven by an additional drive motor, whereby the rope is guided from the rope drum to the rope ejector roller and is deflected on the rope ejector roller. The drive motor of the rope drum and the additional drive motor of the rope ejector roller are operated so that when the rope is unspooled from the rope drum, and when the rope is wound up onto the rope drum, a minimum rope pre-tension, in particular a constant minimum rope pre-tension, is generated in the segment of the rope between the rope drum and the rope ejector roller.

19 Claims, 3 Drawing Sheets

METHOD FOR THE OPERATION OF A FORESTRY WINCH AND FORESTRY WINCH

CROSS REFERENCE TO RELATED APPLICATIONS

This application claims priority to German Patent Application Nos. 10 2021 112 421.2 filed May 12, 2021, and 10 2021 113 379.3 filed May 25, 2021, the disclosures of which are hereby incorporated by reference in their entireties.

BACKGROUND OF THE INVENTION

Field of the Invention

The disclosure relates to a method for the operation of a forestry winch which has a rope drum driven by a drive motor, on which a rope is wound, and a rope ejector roller driven by an additional drive motor for the rope, wherein the rope is guided from the rope drum to the rope ejector roller and is deflected on the rope ejector roller.

Description of Related Art

On forestry winches it is known that a rope located on the rope drum which is driven by a drive motor can be guided over a rope ejector roller, which is driven by an additional drive motor.

On forestry winches of this type it is desirable to unspool the rope from the rope drum in a safe and orderly manner and to wind up the rope on the rope drum in a safe and orderly manner, to make possible a smooth operation of the forestry wedge that protects the rope.

SUMMARY OF THE INVENTION

The object of this disclosure is to make available a method for the operation of a forestry winch of the type described above with which a safe and orderly unspooling of the rope from the rope drum as the rope is being paid out, and a safe and orderly winding up of the rope onto the rope drum as the rope is being retracted can be achieved.

The disclosure accomplishes this object in that the drive motor of the rope drum and the additional drive motor of the rope ejector roller are operated so that as the rope is unspooled from the rope drum and as the rope is wound up onto the rope drum, a minimum rope pre-tension, in particular a constant minimum rope pre-tension, is generated in the segment of the rope between the rope drum and the rope ejector roller.

According to the disclosure, as a result of an appropriate operation of the drive motor of the rope drum and of the additional drive motor of the rope ejector roller during the unspooling of the rope from the rope drum and during the winding up of the rope onto the rope drum, a preferably constant minimum rope pre-tension is applied to the rope over the entire speed range, which ensures a safe and orderly unspooling of the rope from the rope drum as the rope is being unspooled and a safe and orderly winding up of the rope on the rope drum as the rope is being wound up. As a result, with little construction expense and in a simple manner and without a mechanical braking device on the additional drive motor or on the rope ejector roller, a safe and orderly unspooling of the rope from the rope drum that does not damage the rope can be achieved as the rope is unspooled from the rope drum and a safe and orderly winding up of the rope onto the rope drum that does not damage the rope as the rope is being wound up can be achieved.

According to one advantageous embodiment of the disclosure, the drive motor of the rope drum is a hydraulic motor which is connected by means of a first pressure medium line and a second pressure medium line to a directional control valve device that controls the drive motor, and the additional drive motor of the rope ejector roller is a hydraulic motor which is connected by means of a first connecting line and a second connecting line to an additional directional control valve device that controls the additional drive motor. The directional control valve device that controls the drive motor of the rope drum and the additional directional control valve device that controls the additional drive motor of the rope ejector roller are operated so that when the rope is being unspooled from the rope drum and when the rope is being wound up onto the rope drum, a minimum rope pre-tension, in particular a constant minimum rope pre-tension, is generated in the segment of the rope between the rope drum and the rope ejector roller. A drive motor of the rope drum in the form of a hydraulic motor that can be actuated by means of a directional control valve device and an additional drive motor of the rope ejector roller in the form of a hydraulic motor that can be actuated by means of an additional directional control valve device make it possible in a simple manner, by an appropriate operation of the directional control valve devices, as the rope is being unspooled from the rope drum and as the rope is being wound up onto the rope drum, to generate the desired minimum rope pre-tension in the segment of the rope between the rope drum and the rope ejector roller.

According to one advantageous embodiment of the disclosure, the directional control valve device and the additional directional control valve device are supplied with pressure medium by a variable displacement pump device. The pump device can have one or more constant displacement pumps, which can be driven by a drive motor at variable speeds to achieve a variable delivery flow rate.

The pump device preferably has a first variable displacement pump which supplies the directional control valve device with pressure medium, and a second variable displacement pump which supplies the additional directional control valve device with pressure medium. With two variable displacement pumps, one of which supplies the hydraulic motor of the rope drum and the other of which supplies the hydraulic motor of the rope ejector roller, the two hydraulic motors can be operated separately from each other in a simple and energy-efficient manner, so that when the rope is being unspooled from the rope drum and when the rope is being wound up onto the rope drum, a desired minimum rope pre-tension is applied to the segment of the rope between the rope drum and the rope ejector roller.

According to one advantageous embodiment of the disclosure, the drive motor of the rope drum and the additional drive motor of the rope ejector roller are operated so that as the rope is unspooled from the rope drum, the drive motor that drives the rope drum is operated as a motor or in a circulation operation, and the additional drive motor that drives the rope ejector roller is operated as a motor, wherein the rope unspooling speed is determined by the additional drive motor that drives the rope ejector roller and is operated as a motor. As a result of the motor operation of the drive motor that drives the rope ejector roller, which determines the rope unspooling speed, as the rope is being unspooled, a desired minimum rope pre-tension can be generated in a simple manner in the segment of the rope between the rope drum and the rope ejector roller. The rope unspooling speed can thereby be set by a corresponding control of the output of the variable displacement pump that supplies the drive motor of the rope ejector roller. If the drive motor that drives the rope drum is operated in a circulation operation, as the rope is being unspooled, the drive motor of the rope drum and the rope drum, as the rope is being unspooled, can be rotated by the additional drive motor which is unspooling the rope from the rope drum. If the drive motor driving the rope drum, as the rope is being unspooled, is operated as a motor, it becomes possible for the drive motor to assist in driving the rope drum, for example, to be able to overcome high bearing friction in a rotary bearing of the rope drum, which cannot be applied via the driven ejector roller via the rope.

It is particularly advantageous if, as in one development of the disclosure, as the rope is being unspooled, the drive motor of the rope drum is operated in a supporting capacity as a function of the load on the additional drive motor of the rope ejector roller.

According to one advantageous embodiment of the disclosure, the drive motor of the rope drum and the additional drive motor of the rope ejector roller are operated so that when the rope is being wound up onto the rope drum, the drive motor driving the rope drum is operated as a motor and the additional drive motor is operated as a pump, in which the additional drive motor is driven by the rope ejector roller, wherein the rope windup speed is determined by the drive motor driving the rope drum which is being operated as a motor. When the rope is being wound up, the drive motor of the rope ejector roller is operated in pump operation, in which the drive motor is driven by the rope ejector roller. In pump operation, the drive motor driven by the ejector roller works as a brake. As a result of the operation of the drive motor that drives the rope drum as a motor, which determines the speed at which the rope is wound up, in connection with the drive motor of the rope ejector roller operated as a pump and working as a brake, as the rope is being wound up, it is possible in a simple manner to generate a desired minimum rope pre-tension in the segment of the rope between the rope drum and the rope ejector roller. The speed at which the rope is wound up can thereby be set by a corresponding control of the delivery of the variable displacement pump that supplies the drive motor of the rope drum.

According to one advantageous embodiment of the disclosure, the directional control valve device that controls the drive motor of the rope drum when the rope is being wound up, is actuated toward a windup control position, in which a delivery line of the pump device is connected with the first pressure medium line and the second pressure medium line is connected with a tank line, and the directional control valve device that controls the drive motor of the rope drum when the rope is being unspooled, is actuated toward an unspooling control position in which the delivery line of the pump device is connected with the second pressure medium line and the first pressure medium line is connected with the tank line. In the windup control position, to wind up the rope, the drive motor that drives the rope drum is operated in the windup direction, and in the unspooling control position, to unspool the rope, the drive motor that drives the rope drum is operated in the unspooling direction.

According to one advantageous embodiment of the disclosure, as the rope is being wound up and unspooled, the additional directional control valve device that controls the additional drive motor of the rope ejector roller is actuated toward an unspooling control position in which a delivery line of the pump device is connected with the first connecting line and the second connecting line is connected with a tank line. The directional control valve device that controls the drive motor of the rope ejector roller therefore has only one unspooling control position into which the directional control valve device is actuated as the rope is being unspooled and wound up. As the rope is being unspooled, in which case the drive motor driving the rope drum is operated in the unspooling direction as a motor, in the unspooling control position, a motor operation of the drive motor that drives the rope ejector roller can be achieved and thus the rope can be unspooled from the rope drum by the drive motor that drives the rope ejector roller in the unspooling direction as a motor, while the minimum rope pre-tension is maintained. As the rope is being wound up, whereby the drive motor driving the rope drum is operated in the windup direction as a motor, with the unspooling control position of the directional control valve device that controls the drive motor of the rope ejector roller, it is possible in a simple manner to achieve a pump operation of the drive motor of the rope ejector roller and thus a braking action of the drive motor of the rope ejector roller, with which, while maintaining the minimum rope pre-tension, the rope is wound up onto the rope drum.

According to one advantageous embodiment of the disclosure, associated with the first connecting line is a pressure limiting valve, by means of which, as the rope is wound up, in the open position the volume flow delivered by the additional drive motor operated as a pump is diverted to a reservoir. As the rope is being wound up and the drive motor of the rope ejector roller is being operated as a pump, the drive motor driven by the rope ejector roller therefore decelerates in response to the opening pressure limiting valve which is associated with the first connecting line. The drive motor of the rope ejector roller operated as a pump therefore acts as a brake and ensures the minimum rope pre-tension as the rope is being wound onto the rope drum.

According to one advantageous embodiment of the disclosure, associated with the second connecting line is an anti-cavitation valve, by means of which, when the rope is being wound up, in the open position pressure medium is drawn out of a reservoir by the additional drive motor being operated as a pump. As the rope is being wound up and the drive motor of the rope ejector roller is being operated as a pump, the presence of the anti-cavitation valve makes it possible in a simple manner for the drive motor being operated as a pump to draw pressure fluid at the first connecting line via the opened anti-cavitation valve from the reservoir.

It is particularly advantageous if, as the rope is being wound up, the additional directional control valve device that controls the additional drive motor of the rope ejector roller is actuated toward the unspooling control position and then (subsequently) the directional control valve device that controls the drive motor of the rope drum is actuated toward the windup control position. It thereby becomes possible for the additional drive motor of the rope ejector roller to apply tension to the rope as the rope is being wound up, before the rope is wound up onto the rope drum by the drive motor of the rope drum.

It is particularly advantageous if, as the rope is being unspooled, the additional directional control valve device that controls the additional drive motor is actuated toward the unspooling direction and then (subsequently) the drive motor of the directional control valve device that controls the rope drum is actuated toward the unspooling position. It thereby becomes possible for the additional drive motor of the rope ejector roller to apply tension to the rope as the rope is being unspooled, before the rope is unspooled from the rope drum by the drive motor of the rope ejector roller and the assisting drive motor of the rope drum.

If a braking device is provided that is in an operative connection with the drive motor of the rope drum, it is advantageous if the braking device which is in an operative connection with the drive motor of the rope drum is actuated into a released position before, as the rope is being wound up, the directional control valve device that controls the drive motor of the rope drum is actuated toward the windup control position or, before, as the rope is being unspooled, the directional control valve device that controls the drive motor of the rope drum is actuated toward the unspooling control position.

If a bypass valve that connects the pressure medium lines is provided in a connecting line that connects the two pressure medium lines and has a shutoff position and a flowthrough position, it is advantageous if sequentially first the bypass valve device is actuated into the shutoff position, and then the braking device is impinged into the released position. This results in a high degree of functional and operational safety of the forestry winch, because unsafe operating conditions, e.g. if the bypass valve device is still in the flowthrough position when the spring-loaded brake is actuated into the released position, in which the rope drum can rotate in an uncontrolled manner when a force is applied to the rope, can be reliably and easily prevented.

According to one development of the disclosure, in a line connecting the first pressure medium line with the second pressure medium line there is a spring-loaded shutoff valve that opens toward the first pressure medium line, in particular a non-return valve, with which, when the rope is being unspooled, the pressure driving the drive motor of the rope drum is limited. With a spring-loaded non-return valve of this type that opens from the second to the first pressure medium line, the pressure driving the drive motor of the rope drum can be limited in a simple manner as the rope is being unspooled, and thus the drive motor of the rope drum can provide support as the rope is being unspooled.

According to one advantageous configuration of the disclosure, in a connecting line connecting the first pressure medium line with the second pressure medium line there is an un-preloaded shutoff valve that opens toward the first pressure medium line, in particular a non-return valve, whereby in the connecting line there is a valve that is controlled as a function of the pressure in the first connecting line, which valve has a shutoff position and a flowthrough position, and is actuated toward the shutoff position as a function of the pressure in the first connecting line. With the valve controlled by the pressure present in the first connecting line, the dynamic pressure from the second to the first pressure medium line can be switched between a low dynamic pressure of the un-preloaded shutoff valve and a higher dynamic pressure of the spring-loaded shutoff valve. In the event of a rise of the pressure in the first connecting line, it thereby becomes possible to switch to the higher dynamic pressure, so that in the event of a corresponding actuation of the directional control valve device, the rope drum is driven by the drive motor so that the rope ejector roller driven by the additional drive motor is assisted as the rope is unspooled by the rope drum driven in the unspooling direction.

The disclosure further relates to a forestry winch which has a rope drum driven by a drive motor and on which a rope is wound up, and a rope ejector roller driven by an additional drive motor for the rope, whereby the rope is guided from the rope drum to the rope ejector roller and deflected around the rope ejector roller.

The object of the disclosure is accomplished in that an electronic control device is provided which controls the operation of the drive motor of the rope drum and the operation of the additional drive motor of the rope ejector roller, which electronic control device carries out a method as described in the present disclosure.

Preferably the drive motor of the rope drum is in the form of a hydraulic motor which is connected by means of a first pressure medium line and a second pressure medium line to a directional control valve device that controls the drive motor, and that the additional drive motor of the rope ejector roller is in the form of a hydraulic motor which is connected by means of a first connecting line and a second connecting line to an additional directional control valve device that controls the additional drive motor, whereby the directional control valve device that controls the drive motor of the rope drum and the additional directional control valve device that controls the additional drive motor of the rope ejector roller are actuated by the electronic control device. With an electronic control device that actuates the directional control valve devices of the drive motor of the rope drum and the drive motor of the rope ejector roller, it is possible in a simple manner to operate the drive motor of the rope drum and the additional drive motor of the rope ejector roller in such a way that as the rope is being unspooled from the rope drum and as the rope is being wound up onto the rope drum, the minimum rope pre-tension, in particular a constant minimum rope pretension, is applied in the section of the rope between the rope drum and the rope ejector roller.

BRIEF DESCRIPTION OF THE DRAWINGS

Additional advantages and details of the disclosure are explained in greater detail below on the basis of the exemplary embodiments illustrated in the accompanying schematic figures, in which.

DESCRIPTION OF THE DISCLOSURE

Figure 1:
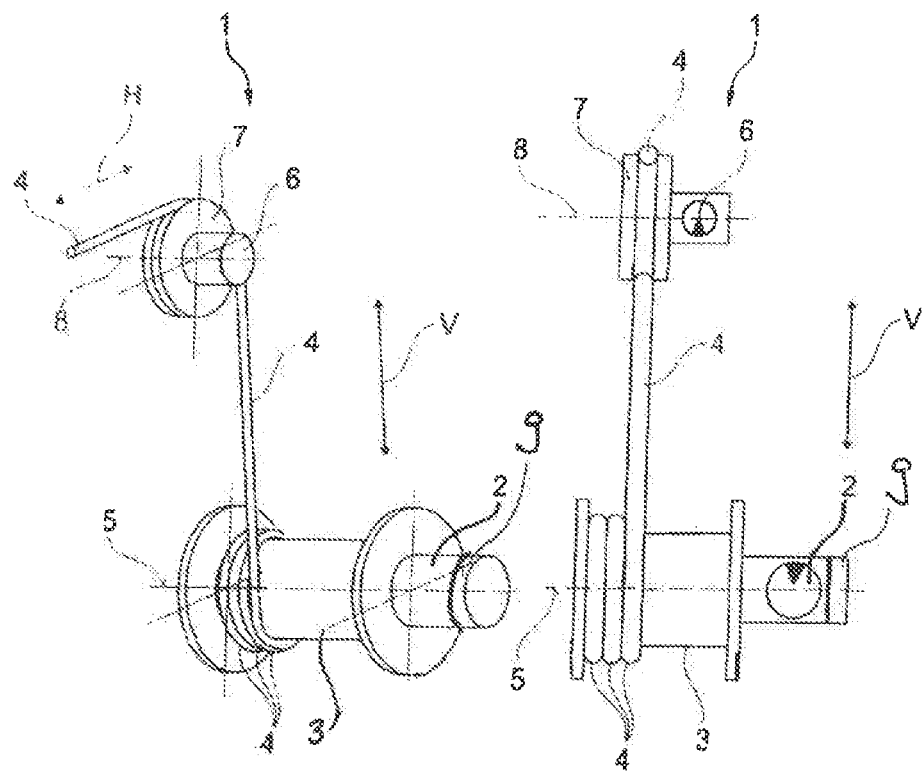
FIG. 1 is a schematic illustration of a forestry winch according to the disclosure.

FIG. 1 is a schematic illustration of a forestry winch 1 according to the disclosure. The illustration on the left in FIG. 1 shows a perspective view and the illustration on the right shows a head-on view of the forestry winch 1 according to the disclosure.

The forestry winch 1 has a rope drum 3 driven by a drive motor 2, on which a rope 4, for example a steel rope or a plastic rope, is wound. The rope drum 3 is arranged so that it can rotate around an axis of rotation 5 and is driven by the drive motor 2 which is a hydraulic motor.

In the illustrated embodiment, the forestry winch 1 further has a rope ejector roller 7 for the rope 4 driven by an additional drive motor 6. The rope ejector roller 7 is arranged so that it can rotate around an axis of rotation 8 and is driven by the drive motor 6, which is a hydraulic motor.

In the illustrated embodiment, the rope 4 is guided in the vertical direction V from the rope drum 3 to the rope ejector roller 7, guided by means of the rope ejector roller 7 and deflected on the rope ejector roller so that the rope 4 is led away in the horizontal direction H by the rope ejector roller 7.

The rope is pressed against the rope ejector roller 7 by means of an application device, which is not illustrated in any greater detail in FIG. 1 to keep the drawing simple.

The rope drum 3 or the drive motor 2 can also be operatively connected with a braking device 9.

Figure 2:
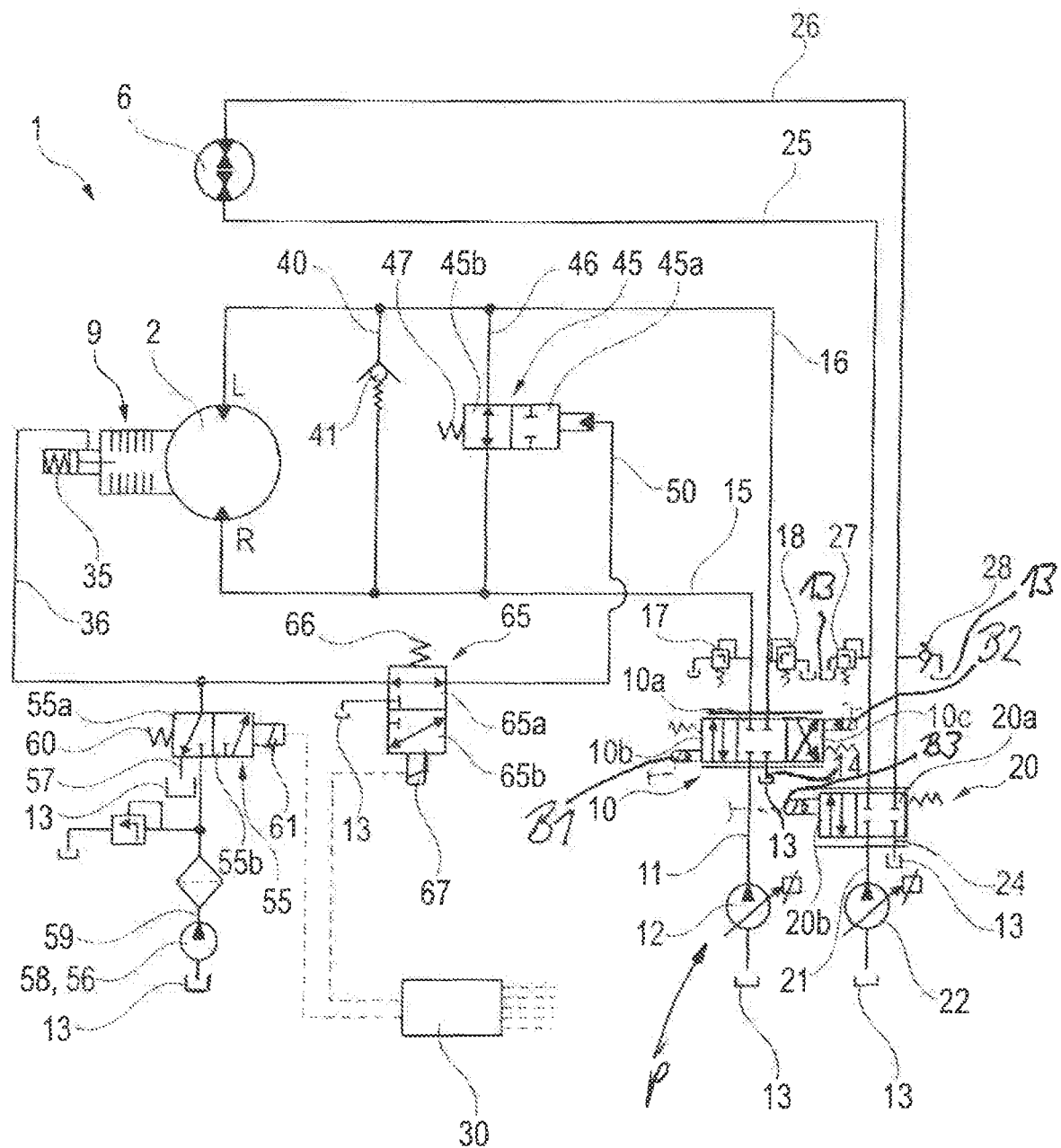
FIG. 2 is a first example of a hydraulic circuit diagram of a forestry winch according to the disclosure.
Figure 3:
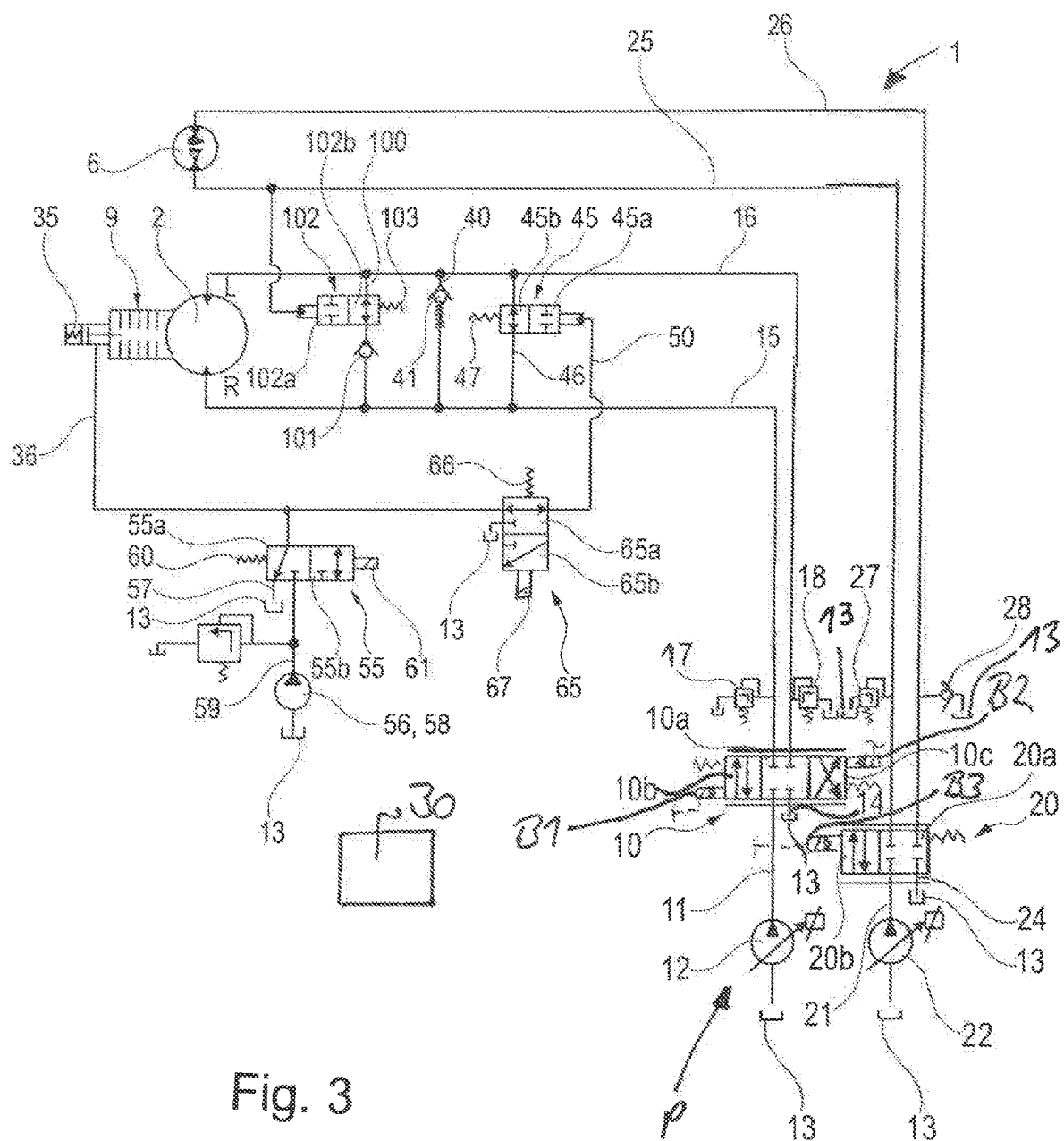
FIG. 3 is a schematic diagram of a hydraulic circuit of a forestry winch according to another embodiment of the disclosure.

FIGS. 2 and 3 show hydraulic circuit diagrams of the forestry winch 1 according to the disclosure. In the figures, identical components are identified by the same reference numbers.

In FIGS. 2 and 3, the drive motor 2, in the form of a hydraulic motor, of the rope drum 3 can be controlled by means of a directional control valve device 10. The directional control valve device 10 and thus the drive motor 2 are supplied with pressure medium by a variable-displacement pump device P. The pump device P has a first variable displacement pump 12, which supplies the directional control valve device 10 and thus the drive motor 2 with pressure medium. The directional control valve device 10 is connected to a delivery line 11 of the first variable pump 12, which draws pressure medium out of a reservoir 13, is connected to a tank line 14 that leads to the reservoir 13, and to a first pressure medium line 15 connected with a connection R of the drive motor 2, as well as to a second pressure medium line 16 connected with a connection L of the drive motor 2. A pressure limiting valve 17 that protects a maximum working pressure in the pressure medium line 15 is connected to the first pressure medium line 15. Correspondingly, a pressure limiting valve 18 that protects a maximum working pressure in the pressure medium line 16 is connected to the second pressure medium line 16.

The directional control valve device 10 is a three-position valve and has a neutral position 10a in which the delivery line 11, the tank line 14 and the pressure medium lines 15, 16 are shut off. The directional control valve device 10 has a rope wind-up control position 10b in which the delivery line 11 is connected with the first pressure medium line 15 and the second pressure medium line 16 is connected with the tank line 14. In the windup control position 10b, the drive motor 2 is operated in the rope winding-up direction, in which the rope 4 is wound onto the rope drum 3. The directional control valve 10 has an unspooling control position 10c in which the delivery line 11 is connected with the second pressure medium line 16 and the first pressure medium line 15 is connected with the tank line 14. In the second control position 10c the drive motor 2 is operated in the unspooling direction in which the rope 4 is unspooled from the rope drum 3.

The directional control valve device 10 is impinged by springs into the neutral position 10a and can be actuated by means of electrically controlled actuator devices B1, B2, e.g. proportional magnets or electrically controlled pressure reducer valves, toward the winding-up control position 10b and toward the unspooling control position 10c. The actuator devices B1, B2 are connected with an electronic control device 30 for their actuation.

The additional drive motor 6 of the rope ejector roller 7 in the form of a hydraulic motor can be controlled by means of an additional directional control valve device 20. The directional control valve device 20 and thus the drive motor 6 are supplied with pressure medium by the variable displacement pump device P. The pump device P has a second variable displacement pump 22 which supplies the directional control valve device 20 and thus the drive motor 6 with pressure medium. The directional control valve device 20 is connected to a delivery line 21 of the second variable displacement pump 22, which draws pressure medium out of the reservoir 13, is connected to a tank line 24 that leads to the reservoir 13, and to a first connecting line 25 connected with a first connection of the drive motor 6 and to a second connecting line 26 connected with a second connection of the drive motor 6.

The first variable displacement pump 12 and the second variable displacement pump 22 are driven by a drive machine which is not illustrated in any further detail, such as an internal combustion motor in the form of a diesel motor.

Connected to the first connecting line 25 is a pressure limiting valve 27 which is connected with the reservoir 13 and protects maximum working pressure in the connecting line 25.

Connected to the second connecting line 26 is an anti-cavitation valve 28, which is connected with the reservoir 13 and, when necessary, opens toward the second connecting line 26.

The directional control valve device 20 is in the form of a two-position valve and has a shutoff position 20a, in which the delivery line 21, the tank line 24 and the connecting lines 25, 26 are shut off. The directional control valve device 20 has an unspooling control position 20b, in which the delivery line 21 is connected with the first connecting line 25 and the second connecting line 26 is connected with the tank line 24.

The directional control valve device 20 is impinged by a spring into the shutoff position 20a, and by an electrically actuated actuator device B3, e.g. a proportional magnet or an electrically controlled pressure reducer valve, toward the unspooling control position 20b. The actuator device B3 is connected for its actuation with the electronic control device 30.

The directional control valves 10, 20 can therefore be actuated by means of the electronic control device 30 into the control positions 10b, 10c, 20b.

The displacement volume of the variable displacement pumps 12, 22 can be adjusted by the electronic control device 30.

The braking device 9 that is operatively connected with the rope drum 3 or the drive motor 2 is in the form of a spring-loaded brake which is impinged by a spring device 35 toward a braking position and by a hydraulic brake release pressure present in a brake release pressure line 36 toward a release position.

In a line 40 that connects the first pressure medium line 15 with the second pressure medium line 16, there is a spring-loaded shutoff valve 41 that opens toward the first pressure medium line 15. The shutoff valve 41 in the illustrated exemplary embodiment is in the form of a non-return valve which is impinged by a spring into a shutoff position.

A bypass valve device 45 can also be provided that connects the two pressure medium lines 15, 16 and is located in a connecting line 46 that connects the two pressure medium lines 15, 16. The bypass valve device 45 in the illustrated exemplary embodiments is in the form of a solenoid valve that has a shutoff position 45a and a flowthrough position 45b.

The bypass valve device 45 is actuated by a hydraulic control pressure present in a control line 50 toward the shutoff position 45a. The bypass valve device 45 is actuated by a spring device 47 toward the flowthrough position 45b.

The spring-loaded brake 9 and the bypass valve device 45 are jointly controlled by a control valve 55.

In the illustrated embodiments, the control valve 55 is in the form of a three-port, two-position valve which is connected at a first port to the control line 50 and the brake release pressure line 36, at a second port to a control pressure source 56, and at a third port to a tank line 57 that leads to the reservoir 13. The control pressure source 56, in the illustrated exemplary embodiment, is in the form of a feed pump 58, which draws pressure medium out of the reservoir 13 and transports it into a delivery line 59 connected to the second port of the control valve 55.

The control valve 55 has a first control position 55a, in which the brake release pressure line 36 and the control line 50 are connected with the reservoir 13 and a second control position 55b, in which the brake release pressure line 36 and the control line 50 are connected with the delivery line 59 and the feed pump 58 and thus with the control pressure source 56. In the first control position 55a, the delivery line 59 is also shut off. In the second control position 55b the tank line 57 is also shut off.

The control valve 55, in the first control position 55a, therefore relieves the brake release pressure line 36 and the control line 50 to the reservoir 13, so that in the first control position 55a the spring-loaded brake 9 is impinged by the spring device 35 into the braking position and the bypass valve 45 is impinged by the spring device 47 into the flowthrough position 45b. The control valve 55, in the second control position 55b, connects the brake release pressure line 36 and the control line 50 with the delivery line 59 of the feed pump 58, so that in the second control position 55b, the spring-loaded brake 9 is impinged by the delivery pressure supplied by the feed pump 58 against the force of the spring device 35 into the release position, and the bypass valve device 45 is impinged by the delivery pressure supplied by the feed pump 58 against the force of the spring device 47 into the shutoff position 45a.

The control valve 55 can be actuated by a spring 60 toward the first control position 55a and by an electrical actuator device 61, for example a solenoid, toward the second control position 55b. The actuator device 61 is in communication with the electronic control device 30 for actuation.

In the control line 50 there can also be a freewheeling valve 65, which in a first control position 65a opens the control line 50 and in a second control position 65b relieves a segment of the control line 50 connected with the bypass valve device 45 to the reservoir 13.

The freewheeling valve 65 can be actuated by a spring 66 toward the first control position 65a and by an electrical actuator device 67, such as a solenoid, for example, toward the second control position 65b. The actuator device 67 is in communication with the electronic control device 30 for actuation.

On the forestry winch 1 according to the disclosure, the electronic control device 30 is realized so that the drive motor 2 of the rope drum 3 and the additional drive motor 6 of the rope ejector roller 7 are operated so that when the rope 4 is unspooled from the rope drum 3 and when the rope 4 is being wound up onto the rope drum 3, a minimum rope pre-tension, in particular a constant rope pretension, is generated in the segment of the rope 4 between the rope drum 3 and the rope ejector roller 7. Consequently a safe, orderly, rope-protecting unspooling of the rope 4 from the rope drum 3 can be ensured during unspooling of the rope 4, and a safe, orderly, rope-protecting winding up of the rope 4 on the rope drum 3 can be ensured when the rope 4 is wound up.

For this purpose, the directional control valve device 10 that controls the drive motor 2 of the rope drum 3 and the additional directional control valve device 20 that controls the additional drive motor 6 of the rope ejector roller are operated by the electronic control device 30 so that as the rope 4 is being unspooled from the rope drum 3 and as a the rope 4 is being wound up on the rope drum 3, the minimum rope pre-tension, in particular a constant minimum rope pre-tension, is generated in the segment of the rope between the rope drum 3 and the rope ejector roller 7.

To unspool the rope 4 from the rope drum 3, the drive motor 2 of the rope drum 3 and the additional drive motor 6 of the rope drum roller 7 are operated by the electronic control device 30 so that as the rope 4 is being unspooled from the rope drum 3, the drive motor 2 driving the rope drum 3 is operated as a motor, and the additional drive motor 6 driving the rope ejector roller 7 is operated as a motor, whereby the rope unspooling speed is determined by the additional drive motor 6 that is operated as a motor and drives the rope ejector roller 7.

For this purpose, the directional control valve device 20 that controls the drive motor 6 of the rope ejector roller 7 is actuated by the electronic control device 30 toward the unspooling control position 20b, so that the connecting line 25 is connected with the delivery line 21 of the variable displacement pump 22 and the drive motor 6 is driven in the unspooling direction by the incoming volume flow in the first connecting line 25 which is connected with the delivery line 21 of the variable displacement pump 22, and is operated as a motor in the unspooling direction. The control valve 55 is further actuated by the electronic control device 30 into the second control position 55b, to impinge the spring-loaded brake 9 into the release position by the delivery pressure supplied by the feed pump 58 against the force of the spring device 35 and to impinge the bypass valve device 45 by the delivery pressure provided by the feed pump 58 into the shutoff position 45a against the force of the spring device 47. The spring 47 of the bypass valve device 45 and the spring 35 of the brake device 8 are thereby designed so that, by the delivery pressure provided by the feed pump 58, sequentially first the bypass valve device 45 is actuated into the shutoff position 45a and then the brake device 9 is actuated into the release position. Then, after the actuation of the directional control valve device 20 toward the unspooling control position 20b, the control device 30 actuates the directional valve device 10 controlling the drive motor 2 of the rope drum 3 toward the unspooling control position 10c, in which the delivery line 11 of the variable displacement pump 12 is connected with the second pressure medium line 16 and the first pressure medium line 15 with the tank line 14, whereby the drive motor 2 is driven in the unspooling direction by the incoming volume flow in the second pressure medium line 16 which is connected with the delivery line 11 of the variable displacement pump 12, and is operated as a motor in the unspooling direction. The pressure driving the drive motor 2 as the rope is unspooled is limited by the spring-loaded shutoff valve 41.

As the rope 4 is unspooled from the rope drum 3, the delivery of the variable displacement pump 22 is controlled by the electronic control device 30 in accordance with the specified rope unspooling speed, so that the rope unspooling speed is determined by the additional drive motor 6 operating as a motor and driving the rope ejector roller 7. As the rope 3 is being unspooled, the drive motor 2 operated as a motor of the rope drum 3 performs only an assisting action and reduces the torque that must be applied by the drive motor 6 during the unspooling of the rope 4 from the rope drum 3, in that the drive motor 2, for example, applies the bearing friction in a rotary bearing of the rope drum 3. As a result, when the rope is being unspooled, the desired minimum rope pre-tension can be ensured in the segment of the rope 4 between the rope ejector roller 7 and the rope drum 3.

As a result of the actuation of the directional control valve device 20 toward the unspooling control position 20b before the actuation of the directional control valve device 10 toward the unspooling control position 10c during the unspooling of the rope 4 from the rope drum 3, the drive motor 6 operating as a motor in the unspooling direction applies tension to the segment of the rope 4 between the rope ejector roller 7 and the rope drum 3 before the rope 4 is unspooled from the rope drum 3.

To wind up the rope 4 onto the rope drum 3, the drive motor 2 of the rope drum 3 and the additional drive motor 6 of the rope ejector roller 7 are operated by the electronic control device 30 so that as the rope 4 is wound up onto the rope drum 3, the drive motor 2 that drives the rope drum 3 is operated as a motor and the additional drive motor 6 that drives the rope ejector roller 7 is operated as a pump, so that the additional drive motor 6 is driven by the rope ejector roller 7, whereby the rope winding speed is determined by the drive motor 2 that is operated as a motor and drives the rope drum 3.

For this purpose, the directional valve control device 20 that controls the drive motor 6 of the rope ejector roller 7 is actuated by the electronic control device 30 toward the unspooling control position 20b, so that the connecting line 25 is in communication with the delivery line 21 of the variable displacement pump 22 and the connecting line 26 is in communication with the tank line 24. Then the control valve 55 is actuated by the electronic control device 30 into the second control position 55b to impinge the spring-loaded brake 9 into the release position by the delivery pressure supplied by the feed pump 58 against the pressure of the spring device 35 and to impinge the bypass valve device 45 into the shutoff position 45a by the delivery pressure supplied by the feed pump 58 against the force of the spring device 47. The spring 47 of the bypass valve device 45 and the spring 35 of the brake device 9 are designed so that by the delivery pressure supplied by the feed pump 58, first the bypass valve device 45 is actuated into the shutoff position 45a and then the brake device 9 is actuated into the release position. Then, after the actuation of the directional control valve device 20 toward the unspooling control position 20b and after the actuation of the control valve 55 into the second control position 55b to release the spring-loaded brake 9, the directional control valve device 10 that controls the drive motor 2 of the rope drum 3 is actuated by the control device 30 toward the winding-up control position 10b, in which the delivery line 11 of the variable displacement pump 12 is in communication with the first pressure medium line 15 and the second pressure medium line 16 is in communication with the tank line 14, whereby the drive motor 2 is driven in the winding-up direction by the incoming volume flow flowing into the first pressure medium line 15, which is in communication with the delivery line 11 of the variable displacement pump 12, and is operated as a motor in the winding-up direction.

As the rope 4 is wound up onto the rope drum 3, the delivery of the variable displacement pump 12 is controlled by the electronic control device 30 as a function of a specified rope windup speed, so that the rope windup speed is determined by the drive motor 2 which drives the rope drum 3 and is operated as a motor.

As a result of the actuation of the directional control valve device 20 toward the unspooling control position 20b before the actuation of the directional control valve device 10 toward the winding-up control position 10b, as the rope 4 is being wound up onto the rope drum 3, the drive motor 6 is briefly actuated, i.e. as long as the directional control valve device 10 is not yet actuated toward the windup control position 10b and the spring-loaded brake 9 is still in the braking position, by the flow delivered by the variable displacement pump 22 in motor operation in the unspooling direction, so that the drive motor 6 applies tension to the segment of the rope 4 between the rope ejector roller 7 and the rope drum 3. As soon as, when the rope 4 is being wound up onto the rope drum 3, the spring-loaded brake 9 is actuated into the release position and the directional control valve device 10 is actuated toward the winding-up control position 10b, and as a result the drive motor 2 driving the rope drum 4 is operated as a motor, the drive motor 6 is driven by the rope ejector roller 7 and the rope 4 guided over the rope ejector roller 7 in winding-up direction and is thereby operated as a pump in the winding-up direction.

The drive motor 6 operated as a pump and in the winding-up direction thereby draws pressure medium located in the connecting line 26 when the control valve device 20 is in the unspooling control position 20b via the tank line 24 from the reservoir 13. In addition, the drive motor 6 operated as a pump can draw pressure medium from the reservoir 13 via the opening anti-cavitation valve 28 to the connecting line 26. The drive motor 6 operated as a pump delivers the pressure medium into the connecting line 25, whereby the volume flow delivered by the drive motor 6 operating as a pump is discharged via the opening pressure limiting valve 27 at the connecting line 25 to the reservoir 13. The opening pressure of the pressure relief valve 27 thus represents a braking pressure and the drive motor 6 operating as a pump acts as a brake as the rope is wound up and ensures the minimum rope pre-tension in the segment of the rope 4 between the rope ejector roller 7 and the rope drum 3 as the rope is wound up.

FIG. 3 illustrates a variant of FIG. 2, in which, there is an un-preloaded shutoff valve 101, for example a non-return valve, that opens toward the first pressure medium line 15 in the connecting line 100 that connects the first pressure medium line 15 with the second pressure medium line 16.

In the connecting line 100 there is also a valve 102 controlled as a function of the pressure in the first connecting line 25, which has a shutoff position 102a and a flowthrough position 102b. The valve 102 is actuated by a spring 103 toward the flowthrough position 102b and as a function of the pressure in the first connecting line 25 toward the shutoff position 102a.

In FIG. 3 there are thus two shutoff valves 41, 101, which connect the second pressure medium line 16 with the first pressure medium line 15, whereby the spring-loaded shutoff valve 41 generates a higher dynamic pressure from the second pressure medium line 16 to the first pressure medium line 15 than the unloaded shutoff valve 101. With the valve 102 controlled by the pressure and thus the load of the drive motor 6 of the rope ejector roller 7, the dynamic pressure from the second pressure medium line 16 to the first pressure medium line 15 can thereby be switched between the low pressure of the shutoff valve 101 and the higher pressure of the shutoff valve 41.

FIG. 3 makes it possible that the unspooling of the rope 4 from the rope drum 3 by the drive motor 6 of the rope ejector roller 7 is supported/assisted by the drive motor 2, as a function of the load of the drive motor 6.

When the rope is being unspooled, whereby the directional control valve device 20 is actuated toward the unspooling control position 20b, the drive motor 6 of the rope ejector roller 7 is driven in the unspooling direction by the incoming volume flow in the first connecting line 25, which is connected with the delivery line 21 of the hydraulic pump 22. If, for the operation of the drive motor 6 of the rope ejector roller 7, a pressure in the first connecting line 25 suffices which is less than the preload of the spring 103 of the valve 102, which can be 100 bar, for example, the valve 102 is impinged by the spring 103 into the flowthrough position 102b. The incoming volume flow in the pressure medium line 16, which in the unspooling control position 10c of the directional control valve device 10 is connected with the delivery line 11 of the hydraulic pump 12, can therefore be discharged via the opening shutoff valve 101 at a low dynamic pressure into the pressure medium line 15, which in the control position 10c of the directional control valve 10 is connected with the reservoir 13, so that the drive motor 2 of the rope drum 3 can freely rotate with it, and the rope 4 is unspooled from the rope drum 3 by means of the rope ejector roller 7 driven by the drive motor 6. If the load on the drive motor 6 of the rope ejector roller 7 increases as the rope 4 is being unspooled and the drive motor 6 of the rope ejector roller 7 during unspooling requires for its drive a pressure in the first connecting line 25 that is higher than the preload of the spring 103 of the valve 102, the valve 102 is impinged by the pressure present in the first connecting line 25 into the shutoff position 102a. From the shutoff valve 101, a switch is therefore made to the shutoff valve 41 which is set to a higher dynamic pressure, as a result of which the drive motor 2 of the rope drum 3 is driven in the unspooling direction at the dynamic pressure set at the shutoff valve 41. The rope drum 3 driven by the drive motor 2 therefore assists the drive motor 6 of the rope ejector roller 7 during the unspooling of the rope 4 from the rope drum 3 as a function of the load on the drive motor 6 of the rope ejector roller 7.

The invention claimed is:

1. A method for an operation of a forestry winch comprising a rope drum driven by a drive motor and on which a rope is spooled, and further comprising:
   a rope ejector roller for the rope driven by an additional drive motor,
   whereby the rope is guided from the rope drum to the rope ejector roller and is deflected on the rope ejector roller, the method comprising:
   operating the drive motor of the rope drum and the additional drive motor of the rope ejector roller so that as the rope is being unspooled from the rope drum and as the rope is being wound up onto the rope drum, generating a minimum rope pre-tension in the segment of the rope between the rope drum and the rope ejector roller,
   wherein the drive motor of the rope drum is in the form of a hydraulic motor which is connected by a first pressure medium line and a second pressure medium line to a directional control valve device that controls the drive motor.

2. The method according to claim 1, wherein the additional drive motor of the rope ejector roller is in the form of a hydraulic motor which is connected by a first connecting line and a second connecting line to an additional directional control valve device that controls the additional drive motor, and wherein the directional control valve device that controls the drive motor of the rope drum and the additional directional control valve device that controls the additional drive motor of the rope ejector roller are operated so that when the rope is unspooled from the rope drum and when the rope is wound up onto the rope drum, the minimum rope pre-tension is generated in the segment of the rope between the rope drum and the rope ejector roller.

3. The method according to claim 2, wherein the directional control valve device and the additional directional control valve device are supplied with pressure medium by a variable displacement pump device.

4. The method according to claim 3, wherein the directional control valve device that controls the drive motor of the rope drum, as the rope is being wound up is actuated toward a windup control position, in which a delivery line of the variable displacement pump device is in communication with the first pressure medium line and the second pressure medium line is in communication with a tank line, and wherein the directional control valve device that controls the drive motor of the rope drum, as the rope is being unspooled is actuated toward an unspooling control position in which the delivery line of the variable displacement pump device, is connected with the second pressure medium line and the first pressure medium line is connected with the tank line.

5. The method according to claim 2, wherein the additional directional control valve device that controls the additional drive motor of the rope ejector roller, as the rope is being wound up and unspooled, is actuated toward an unspooling control position, in which a delivery line of the variable displacement pump device is connected with the first connecting line and the second connecting line is connected with a tank line.

6. The method according to claim 2, wherein, associated with the first connecting line is a pressure limiting valve, by means of which, as the rope is being wound up, in an opened position a volume flow delivered by the additional drive motor operate as a pump is diverted to a reservoir.

7. The method according to claim 2, wherein, associated with the second connecting line is an anti-cavitation valve, by means of which, as the rope is being wound up, in an open position, a pressure medium is drawn out of a reservoir by the additional drive motor operated in pump operation.

8. The method according to claim 2, wherein, in a line that connects the first pressure medium line with the second pressure medium line, there is a spring-loaded shutoff valve that opens toward the first pressure medium line, with which shutoff valve the pressure driving the drive motor of the rope drum is limited as the rope is being unspooled.

9. The method according to claim 2, wherein, in a connecting line connecting the first pressure medium line with the second pressure medium line, there is an unpreloaded shutoff valve that opens toward the first pressure medium line, wherein, in the connecting line there is a valve controlled as a function of a pressure in the first connecting line, in which the valve has a shutoff position and a flowthrough position and is actuated toward the shutoff position as a function of the pressure in the first connecting line.

10. The method according to claim 5, wherein, as the rope is being wound up, the additional directional control valve device that controls the additional drive motor of the rope ejector roller is actuated toward the unspooling control position, and then the directional control valve device that controls the drive motor of the rope drum is actuated toward the winding up control position.

11. The method according to claim 5, wherein, as the rope is unspooled, the additional directional control valve that controls the additional drive motor of the rope ejector roller is actuated toward the unspooling control position and then the directional control valve device that controls the drive motor of the rope drum is actuated toward the unspooling control position.

12. The method according to claim 4, wherein a brake device, which is in an operative connection with the drive motor of the rope drum, is actuated into a release position before, when the rope is being wound up, the directional control valve device that controls the drive motor of the rope drum is actuated toward the windup control position, or before, when the rope is being unspooled, the directional control valve device that controls the drive motor of the rope drum is actuated toward the unspooling control position.

13. The method according to claim 12, wherein a bypass valve device that connects the pressure medium lines is provided, which is located in a connecting line that connects the two pressure medium lines and which has a shutoff position and a flowthrough position, whereby first the bypass valve device is actuated into the shutoff position and then the brake device is impinged into the released position.

14. The method according to claim 3, wherein the variable displacement pump device has a first variable displacement pump which supplies the directional control valve device with the pressure medium, and a second variable displacement pump which supplies the additional directional control valve device with the pressure medium.

15. The method according to claim 1, wherein the drive motor of the rope drum and the additional drive motor of the rope ejector roller are operated so that as the rope is unspooled from the rope drum, the drive motor that drives the rope drum is operated as a motor or in a circulation operation, and the additional drive motor that drives the rope ejector roller is operated as a motor, wherein the rope unspooling speed is determined by the additional drive motor operated as a motor that drives the rope ejector roller.

16. The method according to claim 1, wherein as the rope is unspooled, the drive motor of the rope drum is operated to provide assistance as a function of a load on the additional drive motor of the rope ejector roller.

17. The method according to claim 1, wherein the drive motor of the rope drum and the additional drive motor of the rope ejector roller are operated so that as the rope is wound up onto the rope drum, the drive motor that drives the rope drum is operated as a motor and the additional drive motor is operated as a pump, in which the additional drive motor is driven by the rope ejector roller, and wherein the rope windup speed is determined by the drive motor that drives the rope drum and is operated as a motor.

18. A forestry winch, comprising:
a rope drum driven by a drive motor, on which a rope is wound up;
a rope ejector roller for the rope driven by an additional drive motor; and
an electronic control device that controls an operation of the drive motor of the rope drum and an operation of the additional drive motor of the rope ejector roller,
wherein the electronic control device executes a method according to claim 1,
wherein the rope is guided from the rope drum to the rope ejector roller and is deflected on the rope ejector roller,
wherein the drive motor of the rope drum is in the form of a hydraulic motor which is connected by a first pressure medium line and a second pressure medium line to a directional control valve device that controls the drive motor.

19. The forestry winch according to claim 18, wherein the additional drive motor of the rope ejector roller is in the form of a hydraulic motor which is connected by a first connecting line and a second connecting line to an additional directional control valve device that controls the additional drive motor, wherein the directional control valve device that controls the drive motor of the rope drum and the additional directional control valve device that controls the additional drive motor of the rope ejector roller are controlled by the electronic control device.

\* \* \* \* \*